US011301887B2

(12) United States Patent
Benkreira et al.

(10) Patent No.: US 11,301,887 B2
(45) Date of Patent: Apr. 12, 2022

(54) RECOMMENDATION ENGINE FOR RIDESHARE SYSTEM AND VEHICLE ROUTING

(71) Applicant: Capital One Services, LLC, McLean, VA (US)

(72) Inventors: Abdelkader M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/199,849

(22) Filed: Nov. 26, 2018

(65) Prior Publication Data
US 2020/0167810 A1 May 28, 2020

(51) Int. Cl.
*G06Q 30/02* (2012.01)
*G08G 1/00* (2006.01)
*G06Q 50/30* (2012.01)
*G06Q 10/06* (2012.01)

(52) U.S. Cl.
CPC ......... *G06Q 30/0205* (2013.01); *G06Q 50/30* (2013.01); *G08G 1/202* (2013.01); *G06Q 10/06315* (2013.01)

(58) Field of Classification Search
CPC .................. G08G 1/202; G06Q 30/0205
See application file for complete search history.

(56) References Cited

U.S. PATENT DOCUMENTS

| 2007/0214033 | A1* | 9/2007 | Miller | G06Q 10/02 700/11 |
| 2013/0297551 | A1* | 11/2013 | Smith | G06N 5/02 706/48 |
| 2014/0173511 | A1* | 6/2014 | Lehmann | G06Q 10/02 715/810 |
| 2016/0026936 | A1 | 1/2016 | Richardson et al. | |

(Continued)

OTHER PUBLICATIONS

Naghi, Al, and Hani Abdul Rahman. Evaluation framework for organization-based ridesharing: service design considerations and potential for AUB, 2014, Dissertation (Year: 2014).*

(Continued)

*Primary Examiner* — Brian M Epstein
*Assistant Examiner* — Sara Grace Brown
(74) *Attorney, Agent, or Firm* — DLA Piper LLP (US)

(57) ABSTRACT

Embodiments disclosed herein generally related to a system and method for rideshare vehicle routing. A computing system receives, from one or more facilities, one or more transaction requests associated with one or more accounts of an organization associated with the computing system. The computing system maps one or more customers to a respective transaction request. For each facility of the one or more facilities, the computing device identifies a geographic location thereof. The computing system categorizes each of the one or more facilities into one or more boundaries. For each boundary, the computing system determines an estimated number of rideshare vehicles to deploy, based at least on a transaction history of each customer of the one or more customers. The computing system transmits the estimated number of rideshare vehicles to be deployed to each boundary to a rideshare computing system.

18 Claims, 7 Drawing Sheets

(56) References Cited

U.S. PATENT DOCUMENTS

| | | | |
|---|---|---|---|
| 2018/0101800 A1* | 4/2018 | Lecue | G06F 16/252 |
| 2018/0114236 A1* | 4/2018 | Pelikan | G06Q 30/0202 |
| 2018/0225796 A1* | 8/2018 | Liu | G06Q 10/06315 |
| 2018/0315088 A1* | 11/2018 | Bijor | G06Q 30/0269 |
| 2018/0322536 A1* | 11/2018 | Zhang | G06Q 30/0277 |
| 2018/0356239 A1* | 12/2018 | Marco | G06Q 10/025 |
| 2019/0102237 A1* | 4/2019 | Dong | H04L 67/22 |
| 2019/0204097 A1* | 7/2019 | Starns | G07C 5/008 |
| 2019/0228461 A1* | 7/2019 | Domokos | G06Q 30/0613 |

OTHER PUBLICATIONS

El Zarwi, Feras. Modeling and forecasting the impact of major technological and infrastructural changes on travel demand, 2017, University of California, Berkeley (Year: 2017).*

* cited by examiner

RECOMMENDATION ENGINE FOR RIDESHARE SYSTEM AND VEHICLE ROUTING

FIELD OF THE DISCLOSURE

Embodiments disclosed herein generally related to a system and method for rideshare vehicle routing.

BACKGROUND

Rideshare services has increasingly become a more popular mechanism of obtaining transportation services. Rideshare services typically employ an application that may be downloaded to a user's mobile device, through which the user can request a rideshare vehicle. The rideshare application may leverage the mobile device's geolocation module to determine the current location of the user. Eligible rideshare drivers may choose to answer the request, which may prompt the rideshare service to share the user's location with the rideshare driver, such that the rideshare driver can navigate to the user. The availability of current rideshare services depend on the prevalence of rideshare drives in a particular location.

SUMMARY

Embodiments disclosed herein generally related to a system and method for rideshare vehicle routing. In one embodiment, a method of deploying rideshare vehicles to a geographical location is disclosed herein. A computing system receives, from one or more facilities, one or more transaction requests associated with one or more accounts of an organization associated with the computing system. The computing system maps one or more customers to a respective transaction request. For each facility of the one or more facilities, the computing device identifies a geographic location thereof. The computing system categorizes each of the one or more facilities into one or more boundaries. Each boundary of the one or more boundaries includes at least one facility. For each boundary, the computing system determines an estimated number of rideshare vehicles to deploy, based at least on a transaction history of each customer of the one or more customers. The computing system transmits the estimated number of rideshare vehicles to be deployed to each boundary to a rideshare computing system.

In some embodiments, for each boundary, determining, by the computing system, the estimated number of rideshare vehicles to deploy based at least on the transaction history of each customer of the one or more customers includes identifying one or more transaction accounts associated with the customer and determining whether at least one of the one or more transaction accounts includes a previous rideshare transaction.

In some embodiments, for each boundary, determining, by the computing system, the estimated number of rideshare vehicles to deploy based at least on the transaction history of each customer of the one or more customers includes identifying one or more transaction accounts associated with the customer, analyzing one or more transactions across the one or more transaction accounts to generate a confidence factor that represents a likelihood of the customer requesting a rideshare vehicle, determining that the confidence factors exceeds a predetermined threshold, and based on the determining, predicting that the customer will request the rideshare vehicle.

In some embodiments, for each boundary, determining, by the computing system, the estimated number of rideshare vehicles to deploy based at least on the transaction history of each customer of the one or more customers includes generating an initial estimation of rideshare vehicles to deploy based on the transaction history of each customer, determining a market share of the organization in each boundary, and extrapolating the initial estimation of rideshare vehicles to generate the estimated number of rideshare vehicles to deploy to each boundary based on the market share on the organization in each respective boundary.

In some embodiments, for each boundary, determining, by the computing system, the estimated number of rideshare vehicles to deploy based at least on the transaction history of each customer of the one or more customers includes generating an initial estimation of rideshare vehicles to deploy based on the transaction history of each customer, identifying a home address associated with each customer for each boundary, identifying a subset of customers that has downloaded a computing application associated with the organization to a client device of each respective user, for each customer in the subset of customers, interfacing with the client device of each respective user via the computing application executing thereon, determining a current location of each customer in the subset of customers using a geolocation device of each respective client device, and adjusting the initial estimation of rideshare vehicles to generate the estimated number of rideshare vehicles based on the current location of each customer.

In some embodiments, adjusting the initial estimation of rideshare vehicles to generate the estimated number of rideshare vehicles based on the current location of each customer includes for each customer in the subset of customers that is no longer in their determined boundary, scaling down the initial estimation of rideshares to that determined boundary.

In some embodiments, the computing system further identifies a home address associated with each customer for each boundary. The computing system generates an estimated number of customers going to a same geographic area. The computing system transmits the estimated number of customers going to the same geographic area to the rideshare computing system for use in generating a rideshare group.

In another embodiment, a system is disclosed herein. The system includes a processor and a memory. The memory has programming instructions stored thereon, which, when executed by the processor performs an operation. The operation includes receiving, from one or more facilities, one or more transaction requests associated with one or more accounts of an organization associated with the computing system. The operation further includes mapping one or more customers to a respective transaction request. The operation includes identifying a geographic location thereof for each facility of the one or more facilities. The operation further includes assigning each of the one or more facilities into one or more boundaries. Each boundary of the one or more boundaries includes at least one facility. The operation further includes determining an estimated number of rideshare vehicles to deploy for each boundary based at least on a transaction history of each customer of the one or more customers. The operation further includes interfacing with a rideshare computing system via one or more application programming interfaces (APIs). The operation further includes sharing, via the one or more APIs, the estimated number of rideshare vehicles to be deployed to each boundary to a rideshare computing system.

In some embodiments, determining the estimated number of rideshare vehicles to deploy for each boundary based at least on the transaction history of each customer of the one or more customers includes identifying one or more transaction accounts associated with the customer and determining whether at least one of the one or more transaction accounts include a previous rideshare transaction.

In some embodiments, determining the estimated number of rideshare vehicles to deploy for each boundary based at least on the transaction history of each customer of the one or more customers includes identifying one or more transaction accounts associated with the customer, analyzing one or more transactions across the one or more transaction accounts to generate a confidence factor that represents a likelihood of the customer requesting a rideshare vehicle, determining that the confidence factors exceeds a predetermined threshold, and based on the determining, predicting that the customer will request the rideshare vehicle.

In some embodiments, determining the estimated number of rideshare vehicles to deploy for each boundary based at least on the transaction history of each customer of the one or more customers includes generating an initial estimation of rideshare vehicles to deploy based on the transaction history of each customer, determining a market share of the organization in each boundary, and extrapolating the initial estimation of rideshare vehicles to generate the estimated number of rideshare vehicles to deploy to each boundary based on the market share on the organization in each respective boundary.

In some embodiments, determining the estimated number of rideshare vehicles to deploy for each boundary based at least on the transaction history of each customer of the one or more customers includes generating an initial estimation of rideshare vehicles to deploy based on the transaction history of each customer, identifying a home address associated with each customer for each boundary, identifying a subset of customers that has downloaded a computing application associated with the organization to a client device of each respective user, for each customer in the subset of customers, interfacing with the client device of each respective user via the computing application executing thereon, determining a current location of each customer in the subset of customers using a geolocation device of each respective client device, and adjusting the initial estimation of rideshare vehicles to generate the estimated number of rideshare vehicles based on the current location of each customer.

In some embodiments, adjusting the initial estimation of rideshare vehicles to generate the estimated number of rideshare vehicles based on the current location of each customer includes scaling down the initial estimation of rideshares to that determined boundary for each customer in the subset of customers that is no longer in their determined boundary.

In some embodiments, the operation further includes identifying a home address associated with each customer for each boundary. The operation further includes generating an estimated number of customers going to a same geographic area. The operation further includes transmitting the estimated number of customers going to the same geographic area to the rideshare computing system for use in generating a rideshare group.

The operation further includes generating one or more rideshare groups based on the home addresses of customers in each boundary. The one or more rideshare groups include at least two customers. The operation further includes transmitting the one or more rideshare groups to the rideshare computing system.

In another embodiment, a method of deploying rideshare vehicles to a geographical location is disclosed herein. A computing system receives, from one or more facilities located within a geographic boundary, one or more transaction requests associated with one or more accounts of an organization associated with the computing system. The computing system determines an estimated number of rideshare vehicles to deploy to the geographic boundary, based at least on a transaction history of each customer of the one or more customers. The computing system interfaces with a rideshare computing system via one or more application programming interfaces (APIs). The computing system shares, via the one or more APIs, the estimated number of rideshare vehicles to be deployed to the geographic boundary to a rideshare computing system.

In some embodiments, determining, by the computing system, the estimated number of rideshare vehicles to deploy to the geographic boundary based at least on the transaction history of each customer of the one or more customers includes identifying one or more transaction accounts associated with the customer and determining whether at least one of the one or more transaction accounts comprises a rideshare transaction that occurred that day.

In some embodiments, determining, by the computing system, the estimated number of rideshare vehicles to deploy to the geographic boundary based at least on the transaction history of each customer of the one or more customers includes identifying one or more transaction accounts associated with the customer, analyzing one or more transactions across the one or more transaction accounts to generate a confidence factor that represents a likelihood of the customer requesting a rideshare vehicle, determining that the confidence factors exceeds a predetermined threshold, and based on the determining, predicting that the customer will request the rideshare vehicle.

In some embodiments, determining, by the computing system, the estimated number of rideshare vehicles to deploy to the geographic boundary based at least on the transaction history of each customer of the one or more customers includes generating an initial estimation of rideshare vehicles to deploy based on the transaction history of each customer, determining a market share of the organization in each boundary, and extrapolating the initial estimation of rideshare vehicles to generate the estimated number of rideshare vehicles to deploy to the geographic boundary based on the market share on the organization in each respective boundary.

In some embodiments, determining, by the computing system, the estimated number of rideshare vehicles to deploy to the geographic boundary based at least on the transaction history of each customer of the one or more customers includes generating an initial estimation of rideshare vehicles to deploy based on the transaction history of each customer, identifying a home address associated with each customer, identifying a subset of customers that has downloaded a computing application associated with the organization to a client device of each respective user, for each customer in the subset of customers, interfacing with the client device of each respective user via the computing application executing thereon, determining a current location of each customer in the subset of customers using a geolocation device of each respective client device, and adjusting the initial estimation of rideshare vehicles to generate the estimated number of rideshare vehicles based on the current location of each customer.

In some embodiments, adjusting the initial estimation of rideshare vehicles to generate the estimated number of rideshare vehicles based on the current location of each customer includes scaling down the initial estimation of rideshares to be deployed to the geographic boundary for each customer in the subset of customers that is no longer in the geographic boundary.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein are generally directed to a system and method for rideshare vehicle routing. For example, the one or more techniques disclosed herein provide a method of deploying rideshare vehicles to a particular geographical location. Conventional rideshare systems are currently unable to anticipate a number of rideshare vehicles to deploy to a given geographic area. Rather, conventional rideshare systems merely rely on drivers of rideshare vehicles to choose a specific location based on their knowledge of the geographic area. Under these circumstances, certain geographic areas may become oversaturated with rideshare vehicles. For example, a greater than necessary number of rideshare vehicles may be deployed to a given location. In some embodiments, certain geographic areas may not be provided with the necessary number of rideshare vehicles to meet the demand of users. This may lead to longer wait times for some individuals and, in some circumstances, lead those individuals to employ a different rideshare service.

The one or more techniques address the deficiencies of the current system by providing a mechanism that is able to predict a number of rideshare vehicles to deploy to a given location. The current system may leverage transaction requests from certain facilities in a geographic location to predict a number of rideshare vehicles that may be needed. Based on the transaction requests, the current system may identify one or more metrics that may signal a likelihood of a particular user requesting a rideshare vehicle. Such metrics may include, but are not limited to, a proximity of the user's home to the facility, whether the user ordered a rideshare vehicle to navigate to the facility, a pattern of rideshare transactions following a transaction at a particular facility, and the like. By leveraging user transaction data in real time (or near real time), the one or more techniques described herein may provide a more accurate estimate of rideshare vehicles needed in a given location.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
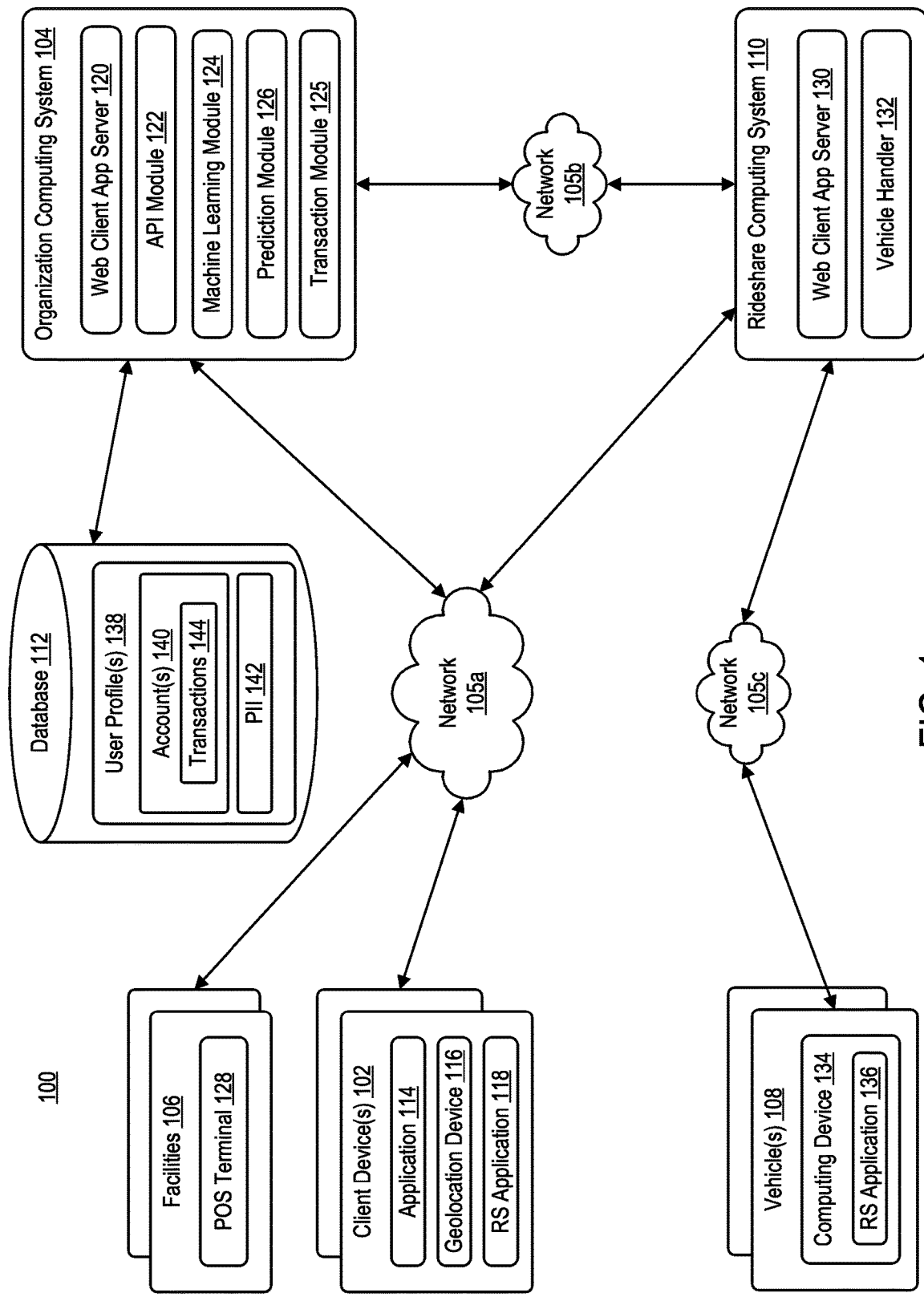
FIG. 1 is a block diagram illustrating a computing environment, according to one exemplary embodiment.

FIG. 1 is a block diagram illustrating a computing environment 100, according to one embodiment. Computing environment 100 may include at least one or more client devices 102, an organization computing system 104, and one or more facilities 106 communicating via network 105a. Computing environment 100 may further include a rideshare computing system 110 communicating with organization computing system 104 via network 105b. Computing environment 100 may further include one or more vehicles 108 communicating with rideshare computing system 110 via network 105c.

Each of network 105a, network 105b, and network 105c may be of any suitable type, including individual connections via the Internet, such as cellular or Wi-Fi networks. In some embodiments, each of network 105a, network 105b, and network 105c may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Each of network 105a, network 105b, and network 105c may include any type of computer networking arrangement used to exchange data. For example, network 105a, network 105b, and network 105c may include any type of computer networking arrangement used to exchange information. For example, each of network 105a, network 105b, network 105c may be the Internet, a private data network, virtual private network using a public network and/or other suitable connection(s) that enables components in computing environment 100 to send and receiving information between the components of system 100.

Client device 102 may be operated by a user (or customer). For example, client device 102 may be a mobile device, a tablet, a desktop computer, or any computing system having the capabilities described herein. Client device 102 may belong to or be provided to a customer (e.g., user 101) or may be borrowed, rented, or shared. Customers may include individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 114, geolocation agent 116, and rideshare (RS) application 118. Application 114 may be representative of a web browser that allows access to a website or a stand-alone application. Client device 102 may access application 114 to access functionality of organization computing system 104. Client device 102 may communicate over network 105*a* to request a webpage, for example, from web client application server 120 of organization computing system 104. For example, client device 102 may be configured to execute application 114 to access content managed by web client application server 120. The content that is displayed to client device 102 may be transmitted from web client application server 120 to client device 102, and subsequently processed by application 114 for display through a graphical user interface (GUI) of client device 102.

Geolocation agent 116 may be one or more software modules. The one or more software modules are collections of signals stored on a media (e.g., memory of client device 102) that represent a series of machine instructions (e.g., program code) that implements one or more algorithmic steps. Such machine instructions may be the actual computer code the processer of client device 102 interprets to implement the instructions, or, alternatively, may be a higher level coding of the instructions that is interpreted to obtain the actual computer code. The one or more software modules may also include one or more hardware components. One or more aspects of the algorithm may be performed by the hardware components (e.g., circuitry) itself, rather as a result of an instruction.

Geolocation agent 116 may be configured to track a location of client device 102. For example, when enabled, geolocation agent 116 may utilize one or more global positioning system (GPS) modules to identify a current location of client device 102.

Rideshare application 118 may be representative of a web browser that allows access to a website or a stand-alone application. Client device 102 may access rideshare application 118 to access functionality of rideshare computing system 110. Client device 102 may communicate over network 105*a* to request a webpage, for example, from web client application server 130 of organization computing system 104. For example, client device 102 may be configured to execute rideshare application 118 to access content managed by web client application server 130. The content that is displayed to client device 102 may be transmitted from web client application server 130 to client device 102, and subsequently processed by rideshare application 118 for display through a GUI of client device 102.

In operation, user of client device 102 may access rideshare application 118 to request a rideshare vehicle. For example, leveraging geolocation device 116, rideshare application 118 may share a current location of client device 102 with rideshare computing system 110 and request a rideshare vehicle to a location specified by the user.

In operation, a user of client device 102 may interact with organization computing system 104 to manage one or more accounts the user of client device 102 has with the organization associated with organization computing system 104.

Facilities 106 may be representative of one or more facilities at which a user may transact. In some embodiments, facilities 106 may include one or more restaurants at which a user or customer associated with the organization may transact. In some embodiments, facilitates 106 may include one or more service providers with which a user or customer associated with the organization may transact. Generally, each facility 106 may include a point-of-sale (POS) terminal 128. POS terminal 128 may be configured to communicate with organization computing system 104. For example, POS terminal 128 may communicate with organization computing system 104 to transmit a transaction request. The transaction request may include an account associated with the user and a transaction amount.

Organization computing system 104 may include at least web client application server 120, application programming interface (API) module 122, machine learning module 124, transaction module 125, and prediction module 126. Each of API module 122, machine learning module 124, transaction module 125 and prediction module 126 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Transaction module 125 may be configured to manage one or more transactions associated with a user. For example, when a facility 106 transmits a transaction request that includes an account number and a transaction amount, facility 106 may debit the transaction amount from the account corresponding to the account number and credit the transaction amount to an account associated with a facility. In some embodiments, transaction module 125 may further identify a merchant category code corresponding to the transaction request. A merchant category code may correspond classifications of the type of facility that transmitted the transaction request. Such merchant category codes may include, for example, a first merchant category code for a restaurant, a second merchant category code for a drinking establishment, a third merchant category code for a bookstore, and the like. In some embodiments, transaction module 125 may interface with prediction module 126 upon detecting a particular merchant code. For example, transaction module 125 may interface with prediction module 126 upon determining a merchant code from a restaurant or drinking establishment.

Prediction module 126 may be configured to predict a number of rideshare vehicles to deploy to a particular geographic boundary. For example, prediction module 126 may work in conjunction with transaction module 125 and machine learning module 124 to determine a number of rideshare vehicles to deploy to a particular geographic. In some embodiments, the number of rideshare vehicles may be determined based on historical transaction data of each user. For example, prediction module 126 may determine that the user typically orders a rideshare vehicle following a transaction request having a particular merchant category code. In another example, prediction module 126 may determine that the user typically orders a rideshare vehicle on certain days of the week and/or at certain times of the day. For example, prediction module 126 may determine that the user typically orders a rideshare vehicle after dinner but not after lunch. In another example, prediction module 126 may determine that the user has a previous rideshare vehicle transaction preceding the transaction request having a particular merchant category code (i.e., the user ordered a rideshare vehicle to facility 106). In some embodiments, the number of rideshare vehicles may be determined based on a current location of the user. For example, prediction module 126 may request that client device 102 share a current location thereof, following a transaction request having a particular merchant category code. In another example, prediction module 126 may also factor weather conditions into the analysis. For example, prediction module 126 may pull weather data from one or more remote computing systems to identify weather conditions at, or near, a time of transaction. If, for example, the weather conditions are turbulent (e.g., rain, snow, sleet, a threshold low temperature (below freezing), a threshold high temperature, etc.), prediction module 126 may determine that it is more likely that a user will request a rideshare vehicle. Accordingly, prediction module 126 may use a variety of factors to predict whether a user will request a rideshare vehicle.

Machine learning module 124 may include one or more computer systems configured to train a prediction model used by prediction module 126. To train the prediction model, machine learning module 124 may receive, as input, one or more streams of user activity. The one or more streams of user activity may include one or more transactions of one or more users located in a geographic boundary. Such streams of activity may include one or more transaction requests from one or more facilities 106 located in the geographic boundary, one or more previous transactions of each user corresponding to each of the one or more transaction requests, and the like. In some embodiments, machine learning module 124 may further receive, as input, one or more streams of activity associated with similar users in a different geographic boundary. As such, machine learning module 124 may leverage both user specific and user agnostic information to identify both individualized patterns of activity and patterns of activity across all users. Machine learning module 124 may implement one or more machine learning algorithms to train the prediction model. For example, machine learning module 124 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like.

API module 122 may be configured to interface with rideshare computing system 110. For example, organization computing system 104 may communicate with rideshare application system 110 via API module 122. API module 122 may be configured to execute one or more APIs that provide various functionalities related to the operations of organization computing system 104. In some embodiments, API module 122 may include an API adapter that allows API module 122 to interface with and utilize enterprise APIs maintained by organization computing system 104 and/or an associated entity that may be housed on other systems or devices. In some embodiments, APIs may enable functions that include, for example, transmitting the predicted number of rideshare vehicles to be deployed to a geographic boundary to rideshare computing system 110.

Organization computing system 104 may be configured to communicate with database 112. As illustrated, database 112 may include one or more user profiles 138. Each user profile 138 may correspond to a respective user of the organization associated with organization computing system 104. Each user profile 138 may include one or more accounts 140 and personal identification information 142. Each account 140 may correspond to a respective financial account with the organization. For example, within user profile 138 may be one or more credit card accounts and one or more debit card accounts. Each account 140 may include one or more transactions 144. Each transaction 144 may include a monetary amount, a name of a facility, a merchant category code associated with the facility, a date of the transaction, and the like.

Personal identification information 142 may include information associated with the user. In some embodiments, personal identification information 142 may include a name, home address, billing address, mailing address, telephone number, e-mail address, social security number, and the like.

Rideshare computing system 110 may include at least web client application server 130 and vehicle handler 132. In operation, upon receiving a request from a client device 102 for a rideshare vehicle via rideshare application 118 communicating with web client application server 130, vehicle handler 132 may transmit a notification to a rideshare application 136 executing on a computing device 134 of each vehicle 108. The notification may be a rideshare request which may be acted upon by each driver.

In operation, when rideshare computing system 110 receives an estimated number of rideshare vehicles to deploy to a geographic location from organization computing system 104, vehicle handler 132 may interface with one or more computing devices 134 to notify each driver that vehicles are needed in the geographic location.

As illustrated, each vehicle 108 may include a computing device 134 associated therewith. For example, each computing device 134 may correspond to a driver of a respective vehicle 108. Computing device 134 may include rideshare application 136 executing thereon. Rideshare application 136 may be configured to manage one or more rideshare requests transmitted to the driver from rideshare computing system 110.

Figure 2:
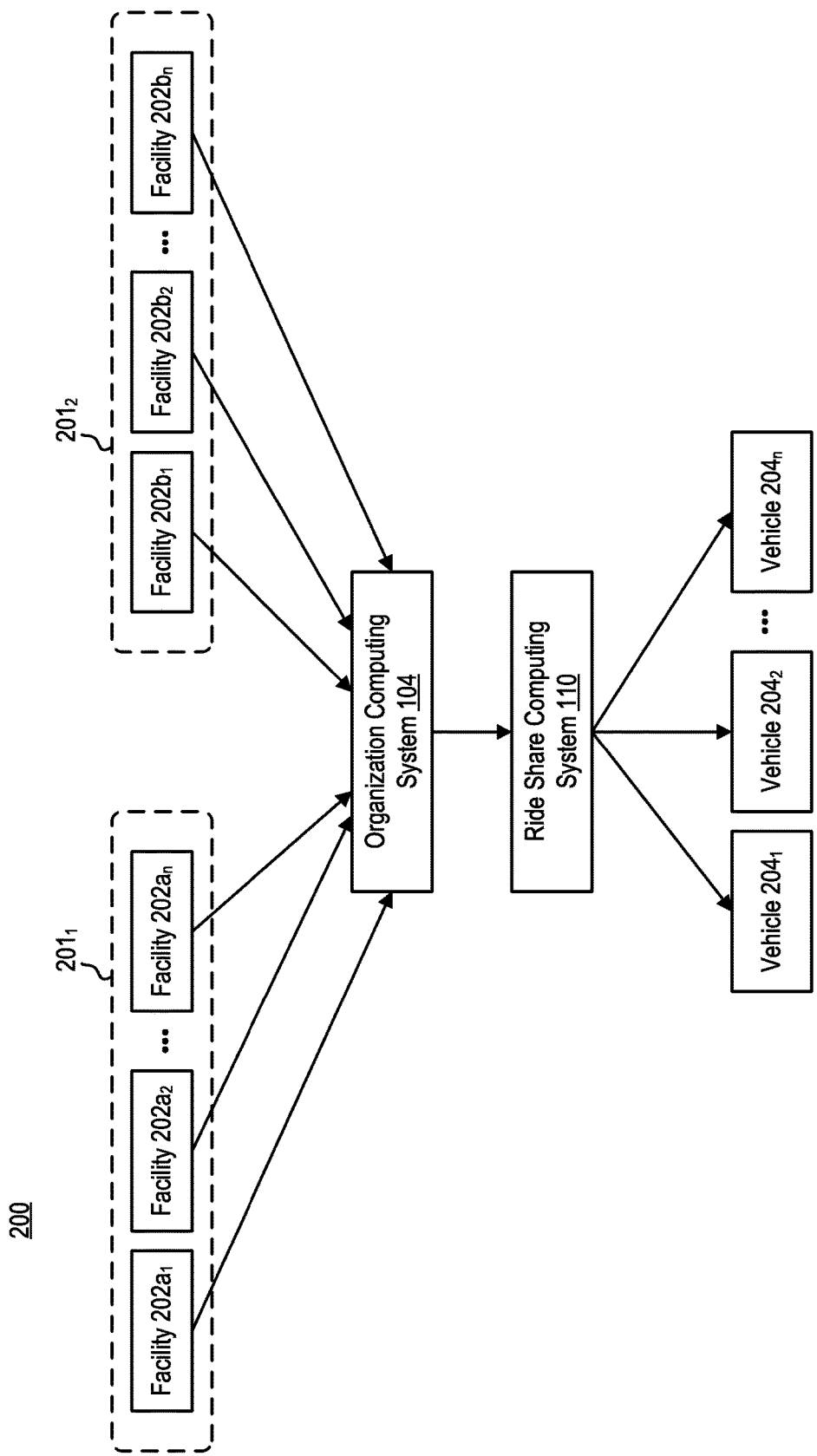
FIG. 2 is a block diagram illustrating a computing environment, according to one exemplary embodiment.

FIG. 2 is a block diagram illustrating a computing environment 200, according to one or more exemplary embodiments. As illustrated, computing environment 200 includes organization computing system 104 communicating with facilities located in one or more geographic boundaries $201_1$, $201_2$ (generally, "geographic boundary 201"). Geographic boundary $201_1$ may include one or more facilities $202a_1$, $202a_2$, and $202a_n$ (generally, "facility $202a$"). Geographic boundary $201_2$ may include one or more facilities $202b_1$, $202b_2$, and $2012_n$ (generally, "facility $202b$").

Organization computing system 104 may receive one or more transaction requests from each of the one or more facilities $202a$ and each of the one or more facilities $202b$. Organization computing system 104 may determine a number of rideshare vehicles to deploy to a particular geographic boundary 201 based on one or more transaction requests, the current location of one or more users, and historical transaction data associated with each user.

Organization computing system 104 may transmit the predicted number of rideshare vehicles to deploy to each geographic boundary 201 to rideshare computing system 110. Rideshare computing system 110 may push one or more notifications to vehicles 204$_1$, 204$_2$ and 204$_n$ (generally, "vehicle 204").

Figure 3:
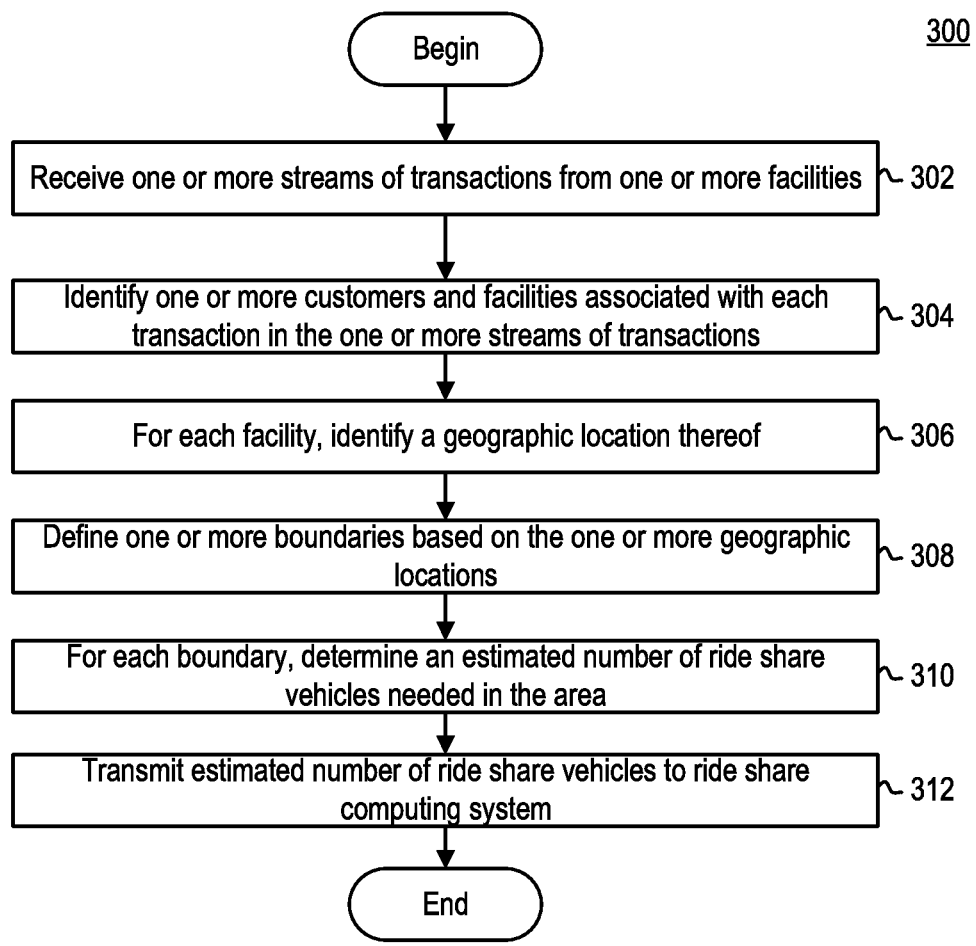
FIG. 3 is a flow diagram illustrating a method of deploying rideshare vehicles to a geographical location, according to one exemplary embodiment.

FIG. 3 is a flow diagram illustrating a method 300 of deploying rideshare vehicles to a geographical location, according to one exemplary embodiment. Method 300 may begin at step 302.

At step 302, organization computing system 104 may receive one or more streams of transactions from one or more facilities 106. For example, organization computing system 104 may receive, in real time (or near real time) one or more transaction requests. Each transaction request may include, for example, a name of a facility 106, a merchant category code associated with facility 106, an account number being used for the transaction, and a transaction amount.

At step 304, organization computing system 104 may identify one or more customers and one or more facilities associated with each transaction request. In some embodiments, transaction module 125 may filter the one or more streams of transaction requests to identify those transaction requests associated with a particular merchant category code. For example, transaction module 125 may filter the one or more streams of transaction requests to identify those transaction requests associated with a restaurant or drinking establishment merchant category code. As such, for each transaction request associated with a restaurant or drinking establishment merchant category code, transaction module 125 may identify a customer associated therewith. For example, transaction module 125 may query database 112 with an account number included in the transaction request to identify a customer associated with each transaction request.

At step 306, organization computing system 104 may identify a geographic location of each facility identified above. In some embodiments, organization computing system 104 may identify a geographic location of each facility 106 using information included in the transaction request. Such information may include, at least, a city and state associated with each facility 106. The information may be more granular and include a street address and/or a zip code associated with each facility 106. For example, the information may further include GPS coordinates of each facility 106. In some embodiments, organization computing system 104 may cross reference information received in the transaction request with one or more external data sources. For example, organization computing system 104 may cross reference information received in the transaction request with facility information stored in database 112. In another example, organization computing system 104 may cross reference information received in the transaction request with publicly available information to determine the location of the facility.

At step 308, organization computing system 104 may define one or more boundaries based on the one or more geographic locations determined above. For example, prediction module 126 may group one or more facilities 106 into one or more boundaries. Each boundary may delineate a geographic area to deploy one or more rideshare vehicles.

At step 310, for each boundary, organization computing system 104 may determine an estimated number of rideshare vehicles to be deployed. For example, prediction module 126 may work in conjunction with machine learning module 124 to determine an estimated number of rideshare vehicles to deploy to each geographic boundary determined above. Prediction module 126 may, for example, retrieve one or more transactions 144 posted to an account 140 of each identified user. For example, prediction module 126 may determine that the user typically orders a rideshare vehicle following a transaction request having a particular merchant category code. In another example, prediction module 126 may determine that the user typically orders a rideshare vehicle on certain days of the week and/or at certain times of the day. For example, prediction module 126 may determine that the user typically orders a rideshare vehicle after dinner but not after lunch. In another example, prediction module 126 may determine that the user has a previous rideshare vehicle transaction preceding the transaction request having a particular merchant category code (i.e., the user ordered a rideshare vehicle to facility 106). In some embodiments, the number of rideshare vehicles may be determined based on a current location of the user. For example, prediction module 126 may request that client device 102 share a current location thereof, following a transaction request having a particular merchant category code. In another example, prediction module 126 may also factor weather conditions into the analysis. For example, prediction module 126 may pull weather data from one or more remote computing systems to identify weather conditions at, or near, a time of transaction. If, for example, the weather conditions are turbulent (e.g., rain, snow, sleet, a threshold low temperature (below freezing), a threshold high temperature, etc.), prediction module 126 may determine that it is more likely that a user will request a rideshare vehicle. Accordingly, prediction module 126 may use a variety of factors to predict whether a user will request a rideshare vehicle.

In some embodiments, prediction module 126 may analyze the one or more transactions 144 to generate a confidence factor. The confidence factor may represent a likelihood that the user will request a rideshare vehicle following the transaction request. For example, prediction module 126 may generate the confidence factor by implementing a prediction model generated by machine learning module 124. By inputting the one or more transactions 144 into prediction model, prediction module 126 may analyze the one or more transactions 144 to identify a transaction pattern contained therein. For example, prediction model may reveal that there is a high likelihood of the user ordering a rideshare vehicle following a transaction request from a restaurant. In another example, prediction model may reveal that there is a high likelihood of the user ordering a rideshare vehicle following a transaction request from a particular facility 106.

At step 312, organization computing system 104 may transmit the estimated number of rideshare vehicles to rideshare computing system 110. For example, API module 122 may implement one or more APIs to communicate the estimated number of rideshare vehicles to be deployed to each geographic boundary to rideshare computing system 110. Rideshare computing system 110 may, in turn, transmit one or more notifications to one or more rideshare vehicles 108 to navigate to a respective geographic boundary.

Figure 4:
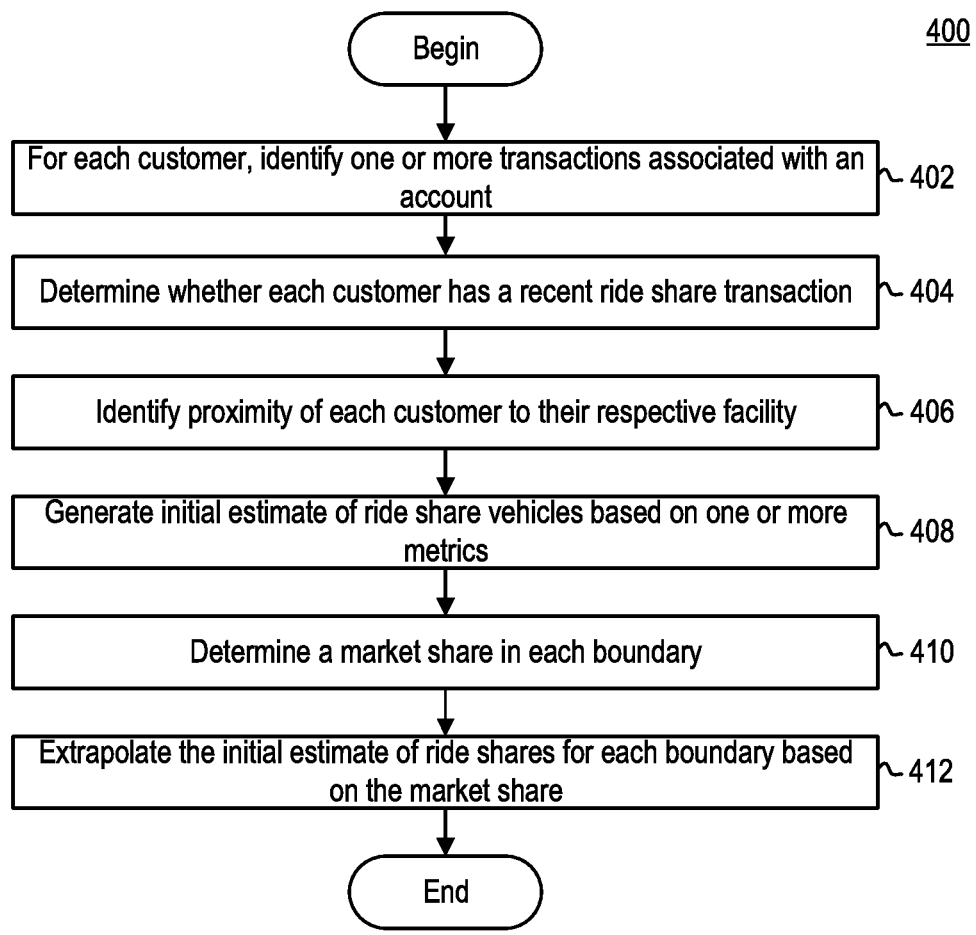
FIG. 4 is a flow diagram illustrating a method of deploying rideshare vehicles to a geographical location, according to one exemplary embodiment.

FIG. 4 is a flow diagram illustrating a method 400 of deploying rideshare vehicles to a geographical location, according to one exemplary embodiment. Method 400 may illustrate one or more operations that may be performed to generate the estimated number of rideshare vehicles to deploy to each geographic boundary in step 310 above in conjunction with FIG. 3. Method 400 may begin at step 402.

At step 402, for each customer, organization computing system 104 may identify one or more transactions 144 associated with an account 140. For example, prediction module 126 may query database 112 with the account number specified in the transaction request to locate an account 140 associated therewith. Prediction module 126 may then identify the one or more transactions 144 associated with account 140. In some embodiments, prediction module 126 may further identify other accounts associated with that particular user. For example, prediction module 126 may determine the particular user has multiple accounts 140 with the organization. Accordingly, prediction module 126 may identify transactions 144 associated with each account 140 corresponding to a particular user.

At step 404, organization computing system 104 may determine whether each customer has a recent rideshare transaction. For example, prediction module 126 may analyze each of the one or more transactions 144 to determine if the user has a rideshare transaction on the same day as the transaction request. A rideshare transaction on the same day as the transaction request may be indicative of the user ordering a rideshare vehicle to facility 106. Those skilled in the art may readily understand that analyzing whether each customer had a recent rideshare transaction does not constrain the analysis to the current day. Rather, the analysis may determine whether each customer has previously ordered a rideshare vehicle.

At step 406, organization computing system 104 may identify a proximity of each customer to their respective facility 106. For example, prediction module 126 may access personal identification information 142 associated with each user profile 138. From personal identification information 142, prediction module 126 may identify a home address of each user. Prediction module 126 may determine a distance between each facility 106 and a respective home address of each user. If prediction module 126 determines that the user lives within a threshold distance from a respective facility 106, prediction module 126 may conclude that a rideshare vehicle is not needed (i.e., the user can walk home). If, however, prediction module 126 determines that the user does not live within a threshold distance from a respective facility 106, prediction module 126 may conclude that there is a greater likelihood that the user may need a rideshare vehicle (i.e., facility 106 is not within walking distance of user's home address).

At step 408, organization computing system 104 may generate an initial estimate of rideshare vehicles based on the one or more metrics provided above. For example, for each geographic boundary, prediction module 126 may generate an initial estimate of rideshare vehicles to deploy based on, whether each user has a recent rideshare transaction and a proximity of each customer to their respective facility 106.

At step 410, organization computing system 104 may determine a market share of the organization in each geographic boundary. For example, organization computing system 104 may determine how many customers the organization has in each geographic boundary as compared to the population of that geographic boundary.

At step 412, organization computing system 104 may extrapolate the initial estimate of rideshare vehicles to generate the final estimate of rideshare vehicles. For example, prediction module 126 may extrapolate the initial estimate of rideshare vehicles for each geographic boundary based on the market share of the organization in each geographic boundary. By extrapolating the initial estimate of rideshare vehicles, prediction module 126 may account for other individuals, who may want to request a rideshare vehicle, that may not have an account with the organization.

Figure 5:
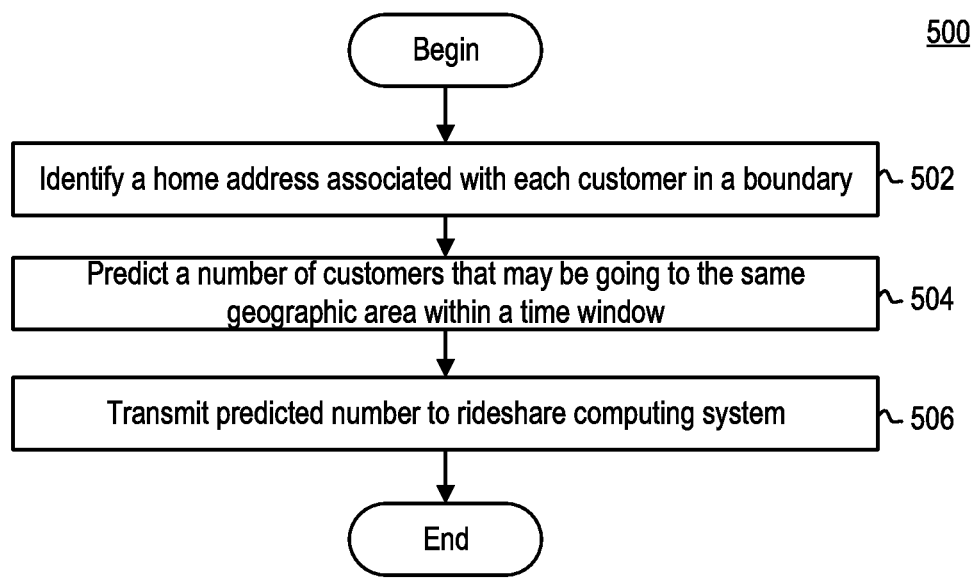
FIG. 5 is a flow diagram illustrating a method of generating a rideshare group, according to one exemplary embodiment.

FIG. 5 is a flow diagram illustrating a method of generating a rideshare group, according to one exemplary embodiment. Method 500 may begin at step 502.

At step 502, organization computing system 104 may identify a home address associated with each customer in each geographic boundary. For example, prediction module 126 may access personal identification information 142 associated with each user profile 138. From personal identification information 142, prediction module 126 may identify a home address of each user.

At step 504, organization computing system 104 may predict a number of customers that may be going to the same geographic area within a time window. Such prediction may aid rideshare computing system 110 in recommending a rideshare group to particular customers. Such prediction may also aid rideshare computing system 110 in advising a driver of the possibility of a rideshare group. Accordingly, rideshare computing system 110 may advise the driver whether, for example, to depart or wait until the rideshare computing system 110 receives another rideshare vehicle request from a customer going to the same geographic area.

At step 506, organization computing system 104 may transmit the predicted number of customers to rideshare computing system 106. For example, API module 122 may implement one or more APIs to communicate the predicted number of customers to rideshare computing system 110. Rideshare computing system 110 may, in turn, transmit one or more notifications to one or more client devices 102 to propose a rideshare option.

Figure 6:
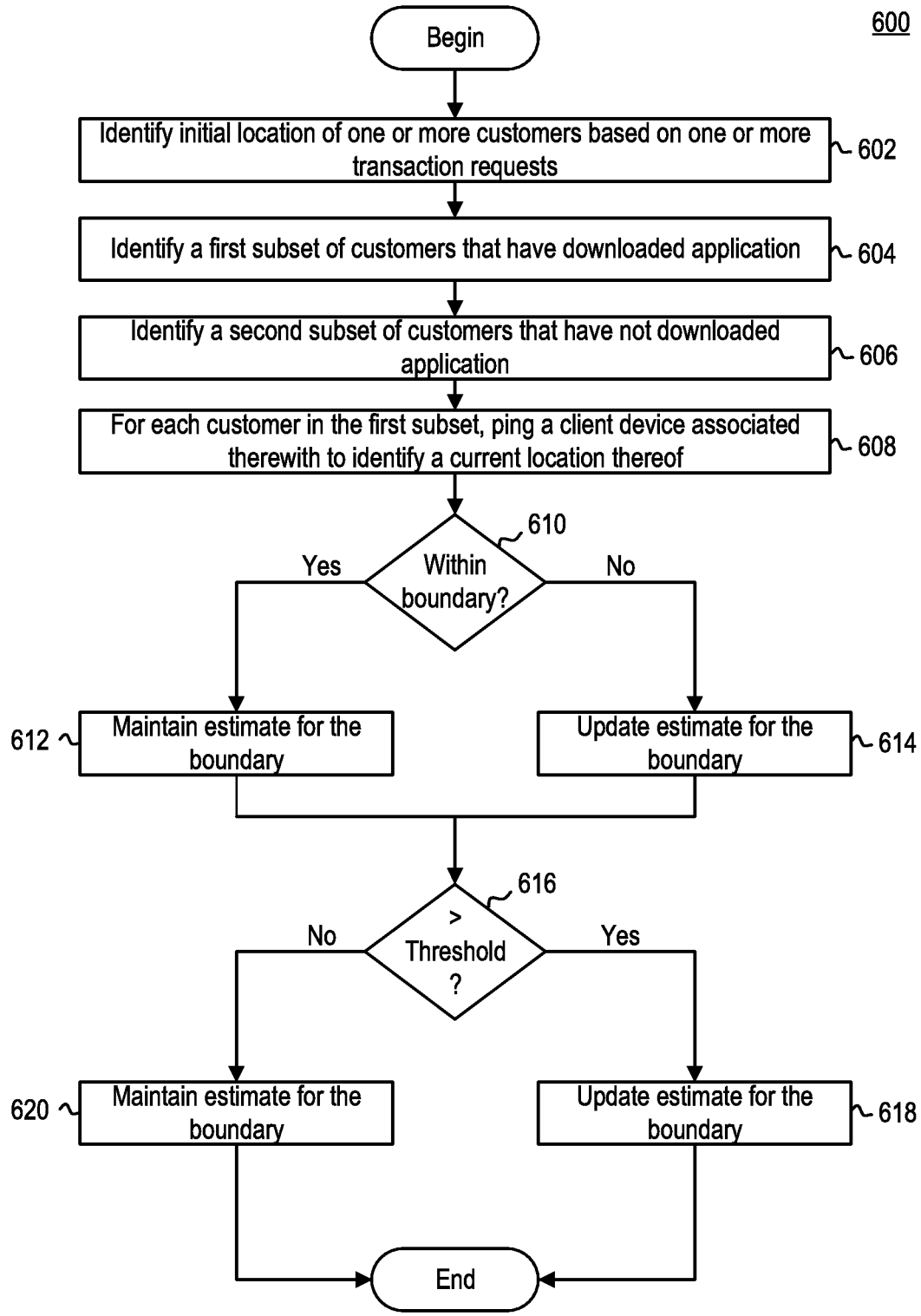
FIG. 6 is a flow diagram illustrating a method of deploying rideshare vehicles to a geographical location, according to one exemplary embodiment.

FIG. 6 is a flow diagram illustrating a method 600 of deploying rideshare vehicles to a geographical location, according to one exemplary embodiment. Method 600 may begin at step 602.

At step 602, organization computing system 104 may identify an initial location of one or more customers based on one or more transaction requests. For example, organization computing system 104 may identify the initial location of one or more customers in accordance with one or more operations discussed above in conjunction with FIGS. 3 and 4. Accordingly, organization computing system 104 may identify one or more customers located in an initial geographic boundary.

At step 604, organization computing system 104 may identify a subset of the one or more customers that have downloaded application 114. For example, prediction module 126 may determine one or more users that have application 114 executing on a client device (e.g., client device 102). Prediction module 126 may determine those users that have application 114 by identifying whether each user has a log-in attempt from the client device.

At step 606, organization computing system 104 may identify a second subset of the one or more customers that have not downloaded application 114. For example, prediction module 126 may identify one or more users that do not have application 114 executing on a client device (e.g., client device 102).

At step 608, for each customer in the first subset of the one or more customers that have downloaded application 114, organization computing system 104 may ping a client device 102 associated with each customer in the subset of customers to identify a current location thereof. For example, prediction module 126 may request that client device 102 share a current location of the customer via application 114. Client device 102 may leverage geolocation device 116 to identify the current location of the customer, and transmit the current location to organization computing system 104.

At step 610, for each customer in the first subset of the one or more customers that have downloaded application 114, organization computing system 104 may determine whether the customer remains in the initial geographic boundary. For example, prediction module 126 may parse the current location information of each customer to determine whether the customer has left a respective facility 106 and traveled outside the geographic location. Such movement of the customer may correspond to the customer navigating to a home location.

If, at step 610, organization computing system 104 determines that the customer remains within the identified geographic boundary, then method 600 proceeds to step 612. At step 612, organization computing system 104 does not adjust the estimate number of rideshare vehicles to deploy to the geographic boundary.

If, however, at step 610, for each customer in the first subset of the one or more customers that have downloaded application 114, organization computing system 104 determines that the customer does not remain in the identified geographic boundary, then method 600 proceeds to step 614. At step 614, organization computing system 104 may update the estimated number of rideshare vehicles to deploy to the geographic location, based on determining that one or more customers have left the geographic boundary. Accordingly, organization computing system 104 may provide to rideshare computing system 110 an up-to-date estimate of rideshare vehicles needed.

At step 616, for each customer in the second subset of the one or more customers that have not downloaded application 114, organization computing system 104 may determine whether a threshold amount of time has passed since the transaction request. For example, organization computing system 104 may treat customers that have not downloaded application 114 as having left the initial boundary location after a threshold period of time has passed, unless organization computing system 104 receives additional transactions indicating that the customer is still within the geographic boundary. In some embodiments, prediction model 126 may also define the threshold length of time based on how long each customer typically waits between transacting at a facility and ordering a ride share when they do order one.

If, at step 616, organization computing system 104 determines that the threshold amount of time has passed since the transaction request, then method 600 proceeds to step 618. At step 618, organization computing system 104 may update the estimated number of rideshare vehicles to deploy to the geographic location. Accordingly, organization computing system 104 may provide to rideshare computing system 110 an up-to-date estimate of rideshare vehicles needed.

If, however, at step 616, organization computing system 104 determines that the threshold amount of time has not passed since the transaction request, then method 600 proceeds to step 620. At step 620, organization computing system 104 does not adjust the estimate number of rideshare vehicles to deploy to the geographic boundary.

Figure 7:
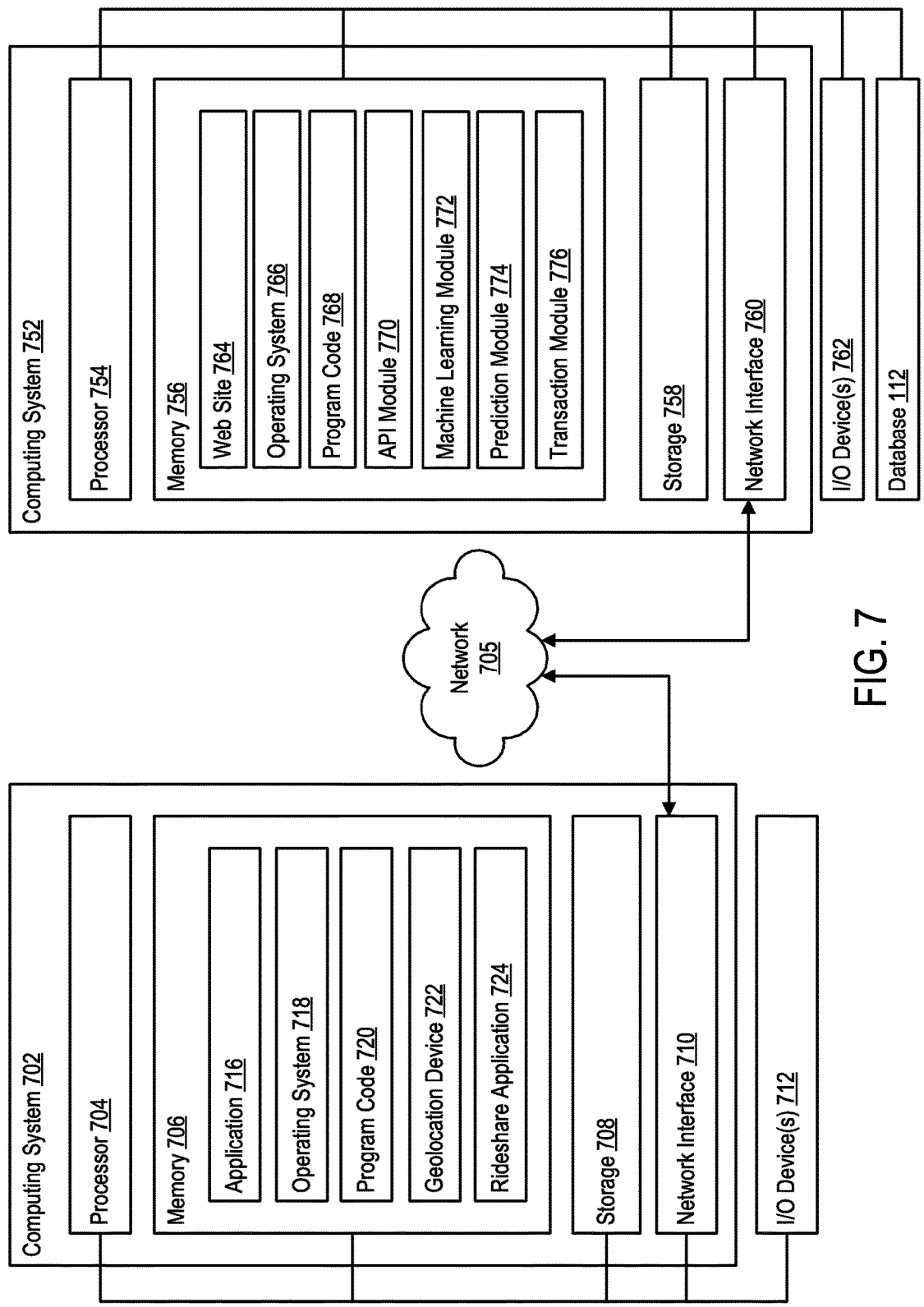
FIG. 7 is a block diagram illustrating a computing environment, according to one embodiment.

FIG. 7 is a block diagram illustrating an exemplary computing environment 700, according to some embodiments. Computing environment 700 includes computing system 702 and computing system 752. Computing system 702 may be representative of client device 102. Computing system 752 may be representative of organization computing system 104.

Computing system 702 may include a processor 704, a memory 706, a storage 708, and a network interface 710. In some embodiments, computing system 702 may be coupled to one or more I/O device(s) 712 (e.g., keyboard, mouse, etc.).

Processor 704 may retrieve and execute program code 720 (i.e., programming instructions) stored in memory 706, as well as stores and retrieves application data. Processor 704 may be included to be representative of a single processor, multiple processors, a single processor having multiple processing cores, and the like. Network interface 710 may be any type of network communications allowing computing system 702 to communicate externally via computing network 705. For example, network interface 710 is configured to enable external communication with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include application 716, operating system 718, program code 720, geolocation agent 722, and rideshare application 724. Program code 720 may be accessed by processor 704 for processing (i.e., executing program instructions). Program code 720 may include, for example, executable instructions for communicating with computing system 752 to display one or more pages of website 764. Application 716 may enable a user of computing system 702 to access a functionality of computing system 752. For example, application 716 may access content managed by computing system 752, such as website 764. The content that is displayed to a user of computing system 702 may be transmitted from computing system 752 to computing system 702, and subsequently processed by application 716 for display through a graphical user interface (GUI) of computing system 702.

Geolocation agent 722 may be configured to track a location of computing system 702. For example, when enabled, geolocation agent a 722 may utilize one or more global positioning system (GPS) modules to identify a current location of computing system 702. Rideshare application 724 may be representative of a web browser that allows access to a website or a stand-alone application. Computing system 702 may access ride application 724 to access functionality of rideshare computing system. In operation, user of computing system 702 may access rideshare application 724 to request a rideshare vehicle. For example, leveraging geolocation device 722, rideshare application 724 may share a current location of computing system 702 with rideshare computing system and request a rideshare vehicle to a location specified by the user.

Computing system 752 may include a processor 754, a memory 756, a storage 758, and a network interface 760. In some embodiments, computing system 752 may be coupled to one or more I/O device(s) 762. In some embodiments, computing system 752 may be in communication with database 112.

Processor 754 may retrieve and execute program code 768 (i.e., programming instructions) stored in memory 756, as well as stores and retrieves application data. Processor 754 is included to be representative of a single processor, multiple processors, a single processor having multiple processing cores, and the like. Network interface 760 may be any type of network communications enabling computing system 752 to communicate externally via computing network 705. For example, network interface 760 allows computing system 752 to communicate with computer system 702.

Storage 758 may be, for example, a disk storage device. Although shown as a single unit, storage 758 may be a combination of fixed and/or removable storage devices, such as fixed disk drives, removable memory cards, optical storage, network attached storage (NAS), storage area network (SAN), and the like.

Memory 756 may include website 764, operating system 766, program code 768, API module 770, machine learning module 772, prediction module 774, and transaction module 776. Program code 768 may be accessed by processor 754 for processing (i.e., executing program instructions). Program code 768 may include, for example, executable instructions configured to perform steps discussed above in conjunction with FIGS. 3-6. As an example, processor 754 may access program code 768 to perform operations for deploying rideshare vehicles to a geographical location. In another example, processor 754 may access program code 768 to perform operations for generating a rideshare group. Website 764 may be accessed by computing system 702. For example, website 764 may include content accessed by computing system 702 via a web browser or application.

Transaction module 776 may be configured to manage one or more transactions associated with a user. For example, when a facility transmits a transaction request that includes an account number and a transaction amount, facility may debit the transaction amount from the account corresponding to the account number and credit the transaction amount to an account associated with a facility. In some embodiments, transaction module 776 may further identify a merchant category code corresponding to the transaction request. In some embodiments, transaction module 776 may interface with transfer agent 774 upon detecting a particular merchant code. For example, transaction module 776 may interface with prediction module 774 upon determining a merchant code from a restaurant or drinking establishment.

Prediction module 774 may be configured to predict a number of rideshare vehicles to deploy to a particular geographic boundary. For example, prediction module 774 work in conjunction with transaction module 776 and machine learning module 772 to determine a number of rideshare vehicles to deploy to a particular geographic.

Machine learning module 772 may include one or more computer systems configured to train a prediction model used by prediction module 774. To train the prediction model, machine learning module 772 may receive, as input, one or more streams of user activity. The one or more streams of user activity may include one or more transactions of one or more users located in a geographic boundary. Such streams of activity may include one or more transaction requests from one or more facilities located in the geographic boundary, one or more previous transactions of each user corresponding to each of the one or more transaction requests, and the like. In some embodiments, machine learning module 772 may further receiver, as input, one or more streams of activity associated with similar users in a different geographic boundary API module 770 may be configured to interface with rideshare computing system. For example, computing system 752 may communicate with rideshare application system via API module 770. API module 770 may be configured to execute one or more APIs that provide various functionalities related to the operations of computing system 752. In some embodiments, APIs may enable functions that include, for example, transmitting the predicted number of rideshare vehicles to be deployed to a geographic boundary to rideshare computing system.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of deploying rideshare vehicles to a geographical location, comprising:
retrieving, by a computing system, a plurality of historical transactions for a plurality of users, wherein each historical transaction of the plurality of historical transactions comprises parameters associated therewith, the plurality of historical transactions comprising a first plurality of historical transactions associated with third party merchants and a second plurality of historical transactions associated with a rideshare provider;
generating, by the computing system, a trained prediction model for predicting a number of rideshare vehicles to deploy to a geographical location by:
generating a plurality of training data sets based on the plurality of historical transactions for the plurality of users; and
learning, via a machine learning model, individualized patterns of user rideshare activity and global patterns of user rideshare activity within a particular geographical location and across geographical locations based on the plurality of training data sets;
receiving, at the computing system from one or more third party facilities, one or more transaction requests associated with one or more accounts of an organization associated with the computing system, wherein the one or more third party facilities are independent of the rideshare provider;
mapping, by the computing system, one or more customers to a respective transaction request;

for each customer, generating, by the prediction model, a confidence factor representing a likelihood that the customer will request a rideshare vehicle following the respective transaction request;

for each third party facility of the one or more third party facilities, identifying, by the computing system, a geographic location thereof;

categorizing, by the computing system, each of the one or more third party facilities into one or more boundaries, wherein each boundary of the one or more boundaries comprises at least one third party facility;

for each boundary, determining, by the computing system using the trained prediction model, an estimated number of rideshare vehicles to deploy, based at least on an individualized transaction history of each customer of the one or more customers, aggregated transaction histories of the one or more customers, and the one or more transaction requests by:

generating an initial estimation of rideshare vehicles to deploy based on the transaction history of each customer and the associated confidence factor;

identifying a home address associated with each customer for each boundary;

identifying a subset of customers that has downloaded a computing application associated with the organization to a client device of each respective user;

for each customer in the subset of customers, interfacing with the client device of each respective user via the computing application executing thereon;

determining a current location of each customer in the subset of customers using a geolocation device of each respective client device;

identifying a second subset of customers that have not downloaded the computing application;

for each customer in the second subset of customers, determining whether a threshold amount of time has passed since the associated transaction request; and adjusting the initial estimation of rideshare vehicles to generate the estimated number of rideshare vehicles based on the current location of each customer and those customers for which the threshold amount of times has not passed, wherein the estimated number of rideshare vehicles reflect those customers that remain in each boundary; and deploying, by the computing system, the estimated number of rideshare vehicles to each boundary.

2. The method of claim 1, wherein, for each boundary, determining, by the computing system, the estimated number of rideshare vehicles to deploy based at least on the transaction history of each customer of the one or more customers, comprises:

identifying one or more transaction accounts associated with the customer; and determining whether at least one of the one or more transaction accounts comprises a previous rideshare transaction.

3. The method of claim 1, wherein, for each boundary, determining, by the computing system, the estimated number of rideshare vehicles to deploy based at least on the transaction history of each customer of the one or more customers, comprises:

identifying one or more transaction accounts associated with the customer;

analyzing one or more transactions across the one or more transaction accounts to generate the confidence factor that represents a likelihood of the customer requesting a rideshare vehicle;

determining that the confidence factors exceeds a predetermined threshold; and based on the determining, predicting that the customer will request the rideshare vehicle.

4. The method of claim 1, wherein, for each boundary, determining, by the computing system, the estimated number of rideshare vehicles to deploy based at least on the transaction history of each customer of the one or more customers, comprises:

generating the initial estimation of rideshare vehicles to deploy based on the transaction history of each customer;

determining a market share of the organization in each boundary; and extrapolating the initial estimation of rideshare vehicles to generate the estimated number of rideshare vehicles to deploy to each boundary based on the market share of the organization in each respective boundary.

5. The method of claim 1, wherein adjusting the initial estimation of rideshare vehicles to generate the estimated number of rideshare vehicles based on the current location of each customer, comprises:

for each customer in the subset of customers that is no longer in their determined boundary, scaling down the initial estimation of rideshares to that determined boundary.

6. The method of claim 1, further comprising:

identifying, by the computing system, the home address associated with each customer for each boundary;

generating, by the computing system, an estimated number of customers going to a same geographic area; and transmitting, by the computing system, the estimated number of customers going to the same geographic area to a rideshare computing system for use in generating a rideshare group.

7. A system, comprising:

a processor; and a memory having programming instructions stored thereon, which, when executed by the processor, performs an operation, comprising:

retrieving a plurality of historical transactions for a plurality of users, wherein each historical transaction of the plurality of historical transactions comprises parameters associated therewith, the plurality of historical transactions comprising a first plurality of historical transactions associated with third party merchants and a second plurality of historical transactions associated with a rideshare provider;

generating a trained prediction model for predicting a number of rideshare vehicles to deploy to a geographical location by:

generating a plurality of training data sets based on the plurality of historical transactions for the plurality of users; and learning, via a machine learning model, individualized patterns of user rideshare activity and global patterns of user rideshare activity within a particular geographical location and across geographical locations based on the plurality of training data sets;

receiving, from one or more third party facilities, one or more transaction requests associated with one or more accounts of an organization associated with the system, wherein the one or more third party facilities are independent of the rideshare provider;

mapping one or more customers to a respective transaction request;

for each customer, generating, by the trained prediction model, a confidence factor representing a likelihood that the customer will request a rideshare vehicle following the respective transaction request;

for each third party facility of the one or more third party facilities, identifying a geographic location thereof;

assigning each of the one or more third party facilities into one or more boundaries, wherein each boundary of the one or more boundaries comprises at least one third party facility;

for each boundary, determining, via the trained prediction model, an estimated number of rideshare vehicles to deploy, based at least on a transaction history of each customer of the one or more customers and the one or more transaction requests by:

generating an initial estimation of rideshare vehicles to deploy based on the transaction history of each customer and the associated confidence factor;

identifying a home address associated with each customer for each boundary;

identifying a subset of customers that has downloaded a computing application associated with the organization to a client device of each respective user;

for each customer in the subset of customers, interfacing with the client device of each respective user via the computing application executing thereon;

determining a current location of each customer in the subset of customers using a geolocation device of each respective client device;

identifying a second subset of customers that have not downloaded the computing application;

for each customer in the second subset of customers, determining whether a threshold amount of time has passed since the associated transaction request; and adjusting the initial estimation of rideshare vehicles to generate the estimated number of rideshare vehicles based on the current location of each customer and those customers for which the threshold amount of times has not passed, wherein the estimated number of rideshare vehicles reflect those customers that remain in each boundary;

interfacing with a rideshare computing system via one or more application programming interfaces (APIs); and deploying the estimated number of rideshare vehicles to each boundary.

8. The system of claim 7, wherein, for each boundary, determining the estimated number of rideshare vehicles to deploy based at least on the transaction history of each customer of the one or more customers, comprises:

identifying one or more transaction accounts associated with the customer; and determining whether at least one of the one or more transaction accounts comprises a previous rideshare transaction.

9. The system of claim 7, wherein, for each boundary, determining the estimated number of rideshare vehicles to deploy based at least on the transaction history of each customer of the one or more customers, comprises:

identifying one or more transaction accounts associated with the customer;

analyzing one or more transactions across the one or more transaction accounts to generate the confidence factor that represents a likelihood of the customer requesting a rideshare vehicle;

determining that the confidence factors exceeds a predetermined threshold; and based on the determining, predicting that the customer will request the rideshare vehicle.

10. The system of claim 7, wherein, for each boundary, determining the estimated number of rideshare vehicles to deploy based at least on the transaction history of each customer of the one or more customers, comprises:

generating the initial estimation of rideshare vehicles to deploy based on the transaction history of each customer;

determining a market share of the organization in each boundary; and extrapolating the initial estimation of rideshare vehicles to generate the estimated number of rideshare vehicles to deploy to each boundary based on the market share of the organization in each respective boundary.

11. The system of claim 7, wherein adjusting the initial estimation of rideshare vehicles to generate the estimated number of rideshare vehicles based on the current location of each customer, comprises:

for each customer in the subset of customers that is no longer in their determined boundary, scaling down the initial estimation of rideshares to that determined boundary.

12. The system of claim 7, further comprising:

identifying the home address associated with each customer for each boundary;

generating an estimated number of customers going to a same geographic area; and transmitting the estimated number of customers going to the same geographic area to the rideshare computing system for use in generating a rideshare group.

13. A non-transitory computer readable medium comprising one or more sequences of instructions, which, when executed by one or more processors, causes a computing system to perform operations, comprising:

retrieving, by the computing system, a plurality of historical transactions for a plurality of users, wherein each historical transaction of the plurality of historical transactions comprises parameters associated therewith, the plurality of historical transactions comprising a first plurality of historical transactions associated with third party merchants and a second plurality of historical transactions associated with a rideshare provider;

generating, by the computing system, a trained prediction model for predicting a number of rideshare vehicles to deploy to a geographical location by:

generating a plurality of training data sets based on the plurality of historical transactions for the plurality of users; and learning, via a machine learning model, individualized patterns of user rideshare activity and global patterns of user rideshare activity within a particular geographical location and across geographical locations based on the plurality of training data sets;

receiving, at the computing system from one or more third party facilities, one or more transaction requests associated with one or more accounts of an organization associated with the computing system, wherein the one or more third party facilities are independent of the rideshare provider;

mapping, by the computing system, one or more customers to a respective transaction request;

for each customer, generating, by the prediction model, a confidence factor representing a likelihood that the customer will request a rideshare vehicle following the respective transaction request;

for each third party facility of the one or more third party facilities, identifying, by the computing system, a geographic location thereof;

categorizing, by the computing system, each of the one or more third party facilities into one or more boundaries, wherein each boundary of the one or more boundaries comprises at least one third party facility;

for each boundary, determining, by the computing system using the trained prediction model, an estimated number of rideshare vehicles to deploy, based at least on an individualized transaction history of each customer of the one or more customers, aggregated transaction histories of the one or more customers, and the one or more transaction requests by:

generating an initial estimation of rideshare vehicles to deploy based on the transaction history of each customer and the associated confidence factor;

identifying a home address associated with each customer for each boundary;

identifying a subset of customers that has downloaded a computing application associated with the organization to a client device of each respective user;

for each customer in the subset of customers, interfacing with the client device of each respective user via the computing application executing thereon;

determining a current location of each customer in the subset of customers using a geolocation device of each respective client device;

identifying a second subset of customers that have not downloaded the computing application;

for each customer in the second subset of customers, determining whether a threshold amount of time has passed since the associated transaction request; and adjusting the initial estimation of rideshare vehicles to generate the estimated number of rideshare vehicles based on the current location of each customer and those customers for which the threshold amount of times has not passed, wherein the estimated number of rideshare vehicles reflect those customers that remain in each boundary; and deploying, by the computing system, the estimated number of rideshare vehicles to each boundary.

14. The non-transitory computer readable medium of claim 13, wherein, for each boundary, determining, by the computing system, the estimated number of rideshare vehicles to deploy based at least on the transaction history of each customer of the one or more customers, comprises:

identifying one or more transaction accounts associated with the customer; and determining whether at least one of the one or more transaction accounts comprises a previous rideshare transaction.

15. The non-transitory computer readable medium of claim 13, wherein, for each boundary, determining, by the computing system, the estimated number of rideshare vehicles to deploy based at least on the transaction history of each customer of the one or more customers, comprises:

identifying one or more transaction accounts associated with the customer;

analyzing one or more transactions across the one or more transaction accounts to generate the confidence factor that represents a likelihood of the customer requesting a rideshare vehicle;

determining that the confidence factors exceeds a predetermined threshold; and based on the determining, predicting that the customer will request the rideshare vehicle.

16. The non-transitory computer readable medium of claim 13, wherein, for each boundary, determining, by the computing system, the estimated number of rideshare vehicles to deploy based at least on the transaction history of each customer of the one or more customers, comprises:

generating the initial estimation of rideshare vehicles to deploy based on the transaction history of each customer;

determining a market share of the organization in each boundary; and extrapolating the initial estimation of rideshare vehicles to generate the estimated number of rideshare vehicles to deploy to each boundary based on the market share of the organization in each respective boundary.

17. The non-transitory computer readable medium of claim 13, wherein adjusting the initial estimation of rideshare vehicles to generate the estimated number of rideshare vehicles based on the current location of each customer, comprises:

for each customer in the subset of customers that is no longer in their determined boundary, scaling down the initial estimation of rideshares to that determined boundary.

18. The non-transitory computer readable medium of claim 13, further comprising:

identifying, by the computing system, the home address associated with each customer for each boundary;

generating, by the computing system, an estimated number of customers going to a same geographic area; and transmitting, by the computing system, the estimated number of customers going to the same geographic area to a rideshare computing system for use in generating a rideshare group.

* * * * *